July 2, 1963     D. S. BRUCE ETAL     3,096,026
CAB LAMP FOR AUTOMOTIVE VEHICLES
Filed Jan. 9, 1961     3 Sheets-Sheet 1

INVENTORS
DONALD S. BRUCE
BY    JOHN B. DICKSON
VILHO KOLJONEN
ATTORNEYS

July 2, 1963 D. S. BRUCE ETAL 3,096,026
CAB LAMP FOR AUTOMOTIVE VEHICLES
Filed Jan. 9, 1961 3 Sheets-Sheet 2

INVENTORS
DONALD S. BRUCE
JOHN B. DICKSON
BY VILHO KOLJONEN
ATTORNEYS

July 2, 1963 D. S. BRUCE ETAL 3,096,026
CAB LAMP FOR AUTOMOTIVE VEHICLES
Filed Jan. 9, 1961 3 Sheets-Sheet 3

INVENTORS
DONALD S. BRUCE
JOHN B. DICKSON
VILHO KOLJONEN
BY Blum, Moscovitz, Friedman & Blum
ATTORNEYS United States Patent Office 3,096,026
Patented July 2, 1963

3,096,026
CAB LAMP FOR AUTOMOTIVE VEHICLES
Donald S. Bruce, Holliston, Mass., and John B. Dickson, Kew Gardens, and Vilho Koljonen, Brooklyn, N.Y., assignors to Signal-Stat Corporation, Brooklyn, N.Y., a corporation of New York
Filed Jan. 9, 1961, Ser. No. 81,300
15 Claims. (Cl. 240—7.1)

This invention relates to indicator lamps for automotive vehicles, particularly trucks, and more particularly to an indicator lamp, of novel constructional features, particularly adapted for mounting on the roof of a truck cab.

One long standing problem in the art of signal and indicator lamps for automotive vehicles, and particularly those for trucks, has been the breakage of lamp filaments due to road shocks transmitted to the body of the truck and, through the lamp socket, to the lamp bulb. While the replacement of bulbs in such lamps represents a quite substantial cost, an even more important factor is that the breakage of lamp filaments during a truck's run leaves the truck without the legally required number of lights, properly located, for signaling and indicating purposes. Consequently, the truck is subject to charges for violation of the marker lamp regulations of various agencies, such as the Interstate Commerce Commission. Unless frequent stops are made to check the condition of the lamps, the truck driver is not usually aware that one or more of his indicator or marker lamps may be inoperative due to a broken bulb or bulb filament.

Another important factor in this field is the desirability of having certain strategically located lamps provide a distinctive aspect readily observable by, for example, the drivers of following vehicles, and effective to give an indication of the vertical and lateral dimensions of the truck or truck-trailer combination. Still a further important factor is that of providing marker and indicator lamps which are so constructed that they may be readily and easily serviced by the operator of the automotive vehicle so that adjustment, repairs and, if necessary, replacements can easily be made on the road without requiring the truck to be taken to a special service center.

In accordance with the present invention, a vehicle marker lamp, and more particularly such a lamp designed for mounting on the cab of a truck or tractor, is provided in which the lamp bulb and its socket are substantially completely isolated from all road shocks to which the vehicle is subjected, and which provides a distinctive indication to the drivers of following vehicles as well as being adapted for ready servicing by the truck driver during a trip and without requiring that the truck be taken to a special service center.

More particularly, the lamp includes a housing which is adjustably mounted on a suitable support base arranged to be secured to the roof of a cab. The adjustable mounting permits the relative angular relationship of the lamp to the roof of the cab to be set with a great deal of accuracy. The lamp bulb and its socket are mounted in this housing by means which prevent the transmission of shocks from the vehicle to the lamp bulb.

More particularly, the lamp socket is secured in a cup-shaped member or shock absorbing mounting of natural or synthetic rubber or the like, having a high degree of flexibility, this cup, adjacent its base, having radial fingers projecting therefrom throughout its circumference. These fingers extend alternately on opposite sides of a diametric plane and are arranged to engage an essentially annular metal mounting plate having a central aperture receiving, preferably with a slight clearance for easy assembly, the generally cylindrical shock isolating mounting cup. This metal member has radially outwardly extending fingers and is normally flat. When it is inserted into the lamp housing, it is pushed in against a ledge and such pushing deforms the metal plate so that it is outwardly concave and the ends of the fingers bite into the material of the lamp housing.

By this arrangement, the lamp socket is, in effect, supported on flexible cantilever fingers of relatively soft material so that all shocks to the vehicle are absorbed by the mounting and not transmitted to the lamp socket and thus not transmitted to the lamp bulb.

The lamp housing is essentially cylindrical in form, having a truncated closed end and a hemispherical forwardly facing projecting surface at its opposite end, this surface being essentially annular. Into this open end of the lamp housing there is inserted a generally tubular lens having a closed outer end and provided with flutes along its inner periphery, these flutes extending longitudinally of the lens. The lamp housing has an annular groove near its outer end which receives a ring, of flexible material and of novel design, arranged to have a releasable engagement in a groove in the external periphery of the open inner end of the lens so as to retain the lens assembled with the housing, the lens having a shoulder just outwardly of this groove which seats against a surface on the housing.

Means are provided for ready removal of the lens from the housing, this means comprising recesses adjacent the base of the lens and formed to receive the blade of a screwdriver which may be used as a lever, with the outer edge of the housing projecting surface as a fulcrum, to force the lens out of its watertight seating relation with its retaining ring. The end of the screwdriver blade engages a ledge at the outer end of either recess, and these ledges are preferably beveled or tapered so as to prevent breaking off of material of the lamp lens during disengagement of the latter from the housing.

The combination of the longitudinally extending flutes on the interior surface of the lens with the hemispherically curved annular housing portion, surrounding the inner end of the lens and having a high reflective surface, provides a novel effect when the lamp is lighted. This effect is that of a sunburst surrounding the central light of the lamp. There is thus provided a very distinctive marker indication for following vehicles. Further, the truncated closed end of the housing permits a relatively wide range of angular adjustment of the lamp in a vertical plane about its mounting base.

For an understanding of the principles of the invention, reference is made to the following description of a typical embodiment thereof as illustrated in the accompanying drawings. In the drawings.

Figure 1:
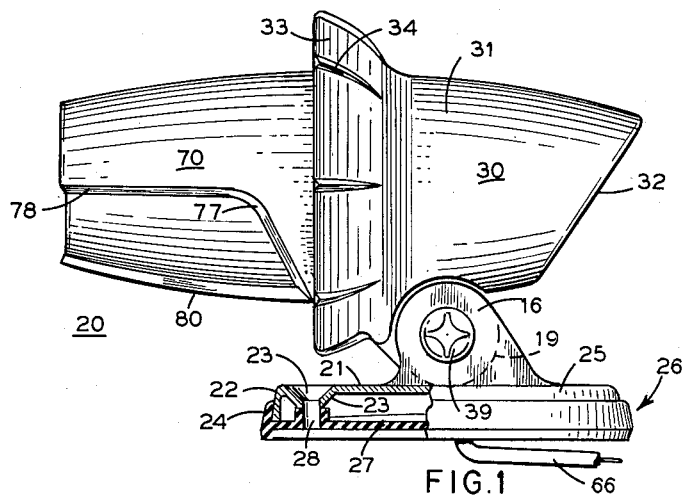
FIG. 1 is a side elevational view of a cab lamp embodying the invention, a part of the base being broken away to illustrate a mounting gasket.
Figure 2:
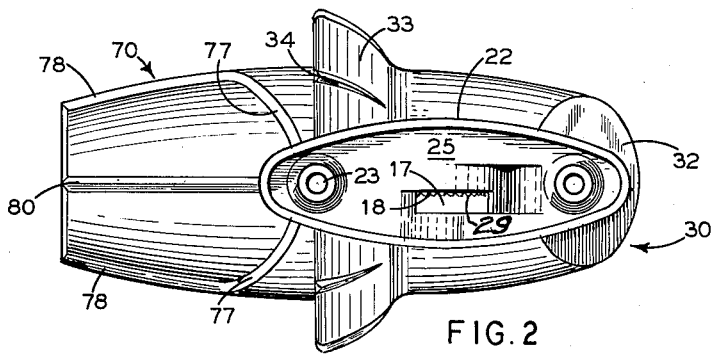
FIG. 2 is a bottom plan view of the lamp.
Figure 3:
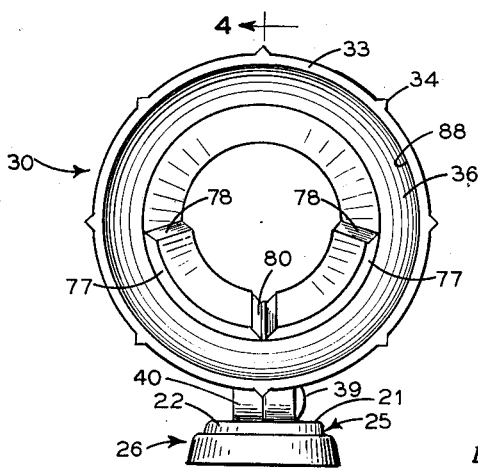
FIG. 3 is an end elevation view of the lamp, looking at the lens.

Referring to FIGS. 1–4 of the drawings, the lamp, which is generally indicated at 20, comprises a base 25 on which is adjustably mounted a metal housing 30 in which is removably secured a lens 70. Base 20 has a generally flat upper wall 21, and is essentially elliptical in plan as best seen in FIG. 2. Wall 21 is bounded by a downwardly and somewhat outwardly extending flange 22, and is formed with a pair of hollow conical apertured offsets 23 for receiving attachment screws. Flange 22 has a tight fit within a peripheral wall 24 of a rubber gasket 26 arranged to engage the roof of a truck cab or the like. Gasket 26 has a flat wall 27 intermediate its height and spaced close to but above its lower edge. The bottom edge of flange 22 seats against the upper surface of wall 27 and a pair of tubular bosses 28 are integral with this wall 27 and extend upwardly in alignment with the screw sockets or hollow enlargements 23, forming, in effect, continuations of the latter.

Base 25 has an apertured ear 16 extending upwardly therefrom on one side of a longitudinal center line joining the screw recesses 23. The inner side of this ear has radial serrations (FIG. 2) which are cooperable with serrations on a mating ear on housing 30, as described more fully hereinafter. Immediately adjacent the inner side of ear 16, base 25 is formed with a relatively elongated slots 17, which in effect, is formed in an arcuate offset bearing portions extending across base 25 from the inner face of ear 16 to the opposite outer edge of the base. At one end of slot 17, base 25 is provided with an upward extension immtdiately adjacent ear 16, this extension having an arcuate surface concentric with that of the arcuate offset 18 and an outer surface flush with the outer surface of ear 16. The purpose of these formations will be described more fully hereinafter.

Housing 30 is generally cylindrical in cross section, including a side wall 31 and a closed end wall 32 which, in effect, gives the housing the appearance of a truncated cylinder. The other end of the housing is open and is bounded by an outwardly flared annular cup portion 33 whose outer surface is substantially hemispherical and preferably formed with ribs 34. The inner surface of flared portion 33 is substantially hemispherical for a short distance inwardly from the open end, but is characterized by a rib 35 having a radial face 36 and by a cylindrical face 37 formed with an annular groove 38. Somewhat inwardly from rib 35, the inner surface of the housing is formed with a shoulder or ledge 39 for a purpose to be described.

An ear 40, having a central threaded aperture 41, extends radially downwardly from housing wall 31 and is disposed to one side of a diametric plane through the housing. A boss 42 surrounds threaded opening 41 and, concentric with boss 42, are arcuate sets of radial serrations 43 and 44. These outwardly extending sets of radial serrations have their circumferentially adjacent ends spaced from each other and are raised from the general surface of ear 40 to define, with boss 42, a circular groove 45. The upper adjacent ends of the sets of serrations 43 and 44 define a passage leading to an aperture 46 in the side wall 31 of housing 30, and the more greatly separated lower ends of the sets of serrations define a passage 47 which, when housing 30 is assembled with base 25, registers with the slot 17 in base 25.

By the described means, a conductor 66 may be brought from inside of housing 30 through passage 46 and groove 45 to passage 47, from which the conductor may pass through the slot 17 and through a suitable aperture (not shown) in the wall 27 of the gasket 24. The connection to the lamp may thus be established through its angularly adjustable connection to the base 25.

When ear 40 is placed against ear 16, with the respective apertures coaxially aligned, the serrations 43, 44 will be engaged with the serrations 29 of ear 16. A suitable screw 39 is placed through the opening in ear 16 and is threaded into the opening 41 so that, by releasing the screw and then retightening same, the housing 30 may be positioned in any desired angular orientation relative to the base 25.

Figure 9:
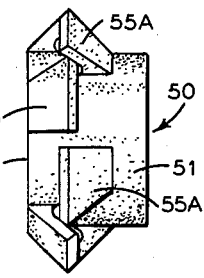
FIG. 9 is a side elevational view thereof.
Figure 11:
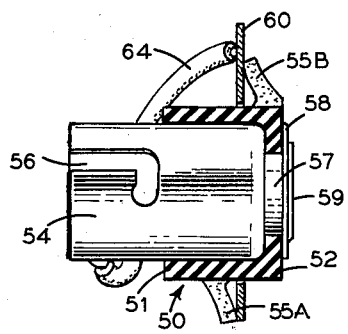
FIG. 11 is an axial sectional view illustrating the assembly of the cup to the mounting plate.
Figure 10:
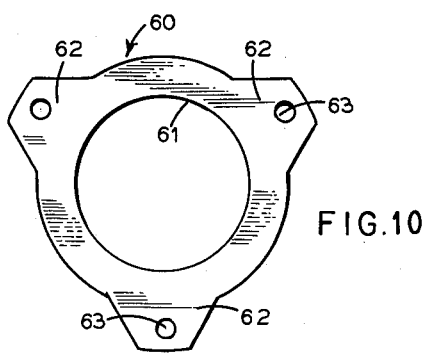
FIG. 10 is a plan view of the metal mounting plate for the shock isolating mounting cup.

As stated, the lamp bulb 67 is mounted in this lamp in such a manner that it is completely isolated from transmission thereto of any road shocks received by the vehicle, so that the filament of the lamp bulb will have an indefinitely long life as compared to the filaments of lamp bulbs in lamps not having this provision. Referring more particularly to FIGS. 4 and 7–11, the shock mounting means of the present invention comprises a cup of soft rubber or other resilient material, for the usual metal lamp socket, this cup being generally indicated at 50. Cup 50 includes a substantially cylindrical portion 51 having an open end and a partially closed opposite end 52 formed with a central aperture 53. A plurality of truncated sector shape fingers 55A and 55B project radially outwardly from the outer surface of cylindrical portion of the mounting 50, these fingers lying in planes which are at an angle to a diametric plane through the cylindrical portion. The fingers are spaced slightly from each other circumferentially of the mounting. Fingers 55A extend radially outwardly and toward end wall 52, whereas the fingers 55B alternating with the fingers 55A extend radially outwardly from about the general plane of wall 52 and angularly away from end wall 52 and toward the open end of the mounting. It will be noted that the fingers 55A and 55B overlap each other, as best seen in FIG. 9, before the shock mount is assembled with a cooperating mounting plate.

A lamp socket 54, having the usual bayonet slots 56, is seated within cylindrical part 51 of the shock mounting and has a reduced end 57 which extends through opening 53 and is spun over against a washer 58, as indicated at 59. Either before or after socket 54 is assembled in shock mounting 50, the shock mounting is assembled with a spring metal mounting plate 60, shown in plan in FIG. 10.

Annular plate 60 may be formed of a suitable resilient and relatively hard metal such as, for example, Phosphor bronze. As illustrated, it has a generally annular shape including an inner circular opening 61 which is slightly larger in diameter than the outer diameter of the cylindrical portion 51 of shock isolating mounting cup 50. At regularly spaced intervals around its circumference, ring 60 is formed with radially extending trapezoidal ears 62, which are preferably apertured as at 63. When ring 60 is placed over the closed or substantially closed end 52 of cup 50, it will bend the fingers 55B inwardly and will bend the fingers 55A toward the open end of the shock mounting until such time as the ring 60 clears the fingers 55B. At this time, the fingers 55B engage beneath or behind the ring 60, with the fingers 55A engaging the opposite surface of the ring 60. A conductor 64 is then soldered or brazed at one bared end to the ring 60 and at the opposite bared end to the socket 54 to make the ground connection for the socket.

Ring 60 is initially flat and remains so as it is set into the open end of housing 30. However, the reduction in the inner diameter of housing 30 just outwardly of the shoulder 39 causes the ring 60 to become dish shaped and, as the ring 60 is moved in to engage the shoulder or ledge 39, the ends of ears 63 tend to dig into the inner surface of the housing 30, securely anchoring the ring in the housing. The cylindrical portion 51 of rubber cup 50 is now supported solely on the ring 60 by the highly flexible fingers 55A and 55B. Consequently, the shock mount has an axial and a radial degree of freedom relative to the ring 60, as well as an angular degree of freedom relative thereto, due to the cantilever effect of fingers 55A and 55B, whereby to absorb any shock transmitted to the ring 60 from the vehicle. A suitable lamp bulb 67 may be then inserted into the sockets 54 and engage the usual spring pressed central contact therein connected to conductor 66 which extends through opening 46 and around groove 45, through opening 47, and through slot 17 and the opening in gasket 27 for connection to a suitable control switch or into a circuit controlled by such a control switch.

As illustrated, the shock isolating cup 50 and the lamp socket 54 are shown as used with a single filament bulb. However, for use with a dual filament bulb, wherein proper orientation of the bulb with respect to a pair of contacts is necessary, the cylindrical portion 51 of cup 50 may be formed with a longitudinally extending recess in its wall to receive a corresponding recess or hollow rib on the socket engageable with a pin on the lamp bulb to properly orient the bulb in the socket. In this case, of course, a pair of conductors will be brought from the base of socket 54 and out of the housing, through the adjustable mounting, and through the gasket 24.

The lens 70 has a unique construction which, in cooperation with the reflecting surface of the annular portion 33 of the housing, provides a distinctive illumination effect when lamp bulb 67 is lighted. Referring to FIGS. 1 through 6, lens 70, which may be molded of a suitable translucent or transparent synthetic resin having a desired collar, such as red, amber, clear, blue, or green, is generally cylindrical in form. Lens 70 has an open base end which is substantially cylindrical, compared to the remainder of the lens, to form a shoulder 71 which will seat against the radial face 36 of rib 35. When shoulder 71 is thus seated, a rectangular cross section circumferential groove 72 in the cylindrical base of lens 70 is aligned with the rectangular cross section groove 38 in the cylindrical face 37 of enlargement or rib 35. These grooves cooperatively receive a special gasket or sealing ring 65 whose initial cross section is shown best in FIG. 12.

Figure 4:
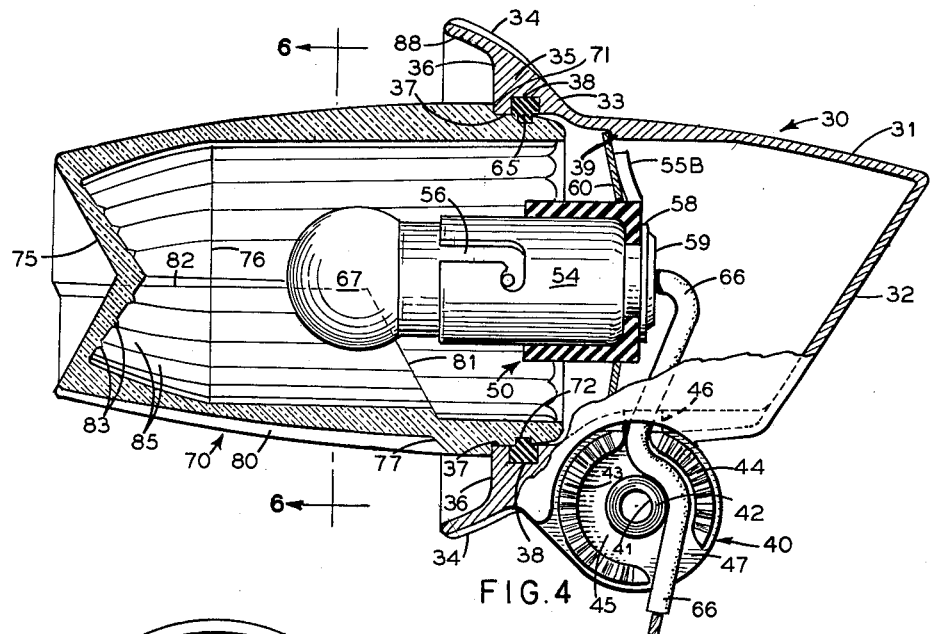
FIG. 4 is a sectional view taken on the line 4—4 of FIG. 3.
Figure 5:
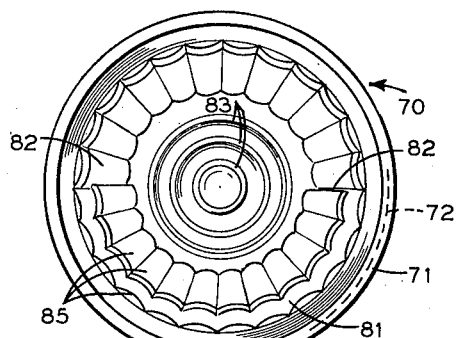
FIG. 5 is an inner end elevational view of the lens.
Figure 6:
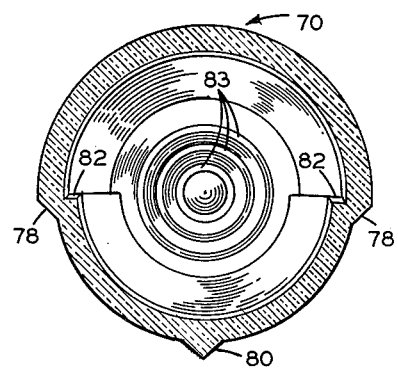
FIG. 6 is a diametric sectional view taken on the line 6—6 of FIG. 4.
Figure 7:
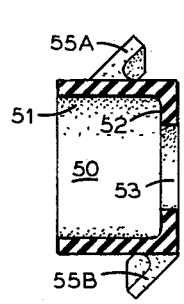
FIG. 7 is an axial sectional view through the shock isolating mounting cup for the lamp bulb socket.
Figure 8:
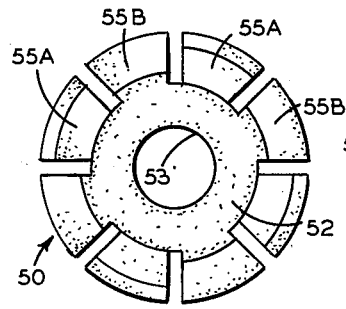
FIG. 8 is an inner end elevational view of the shock isolating mounting cup.
Figure 12:
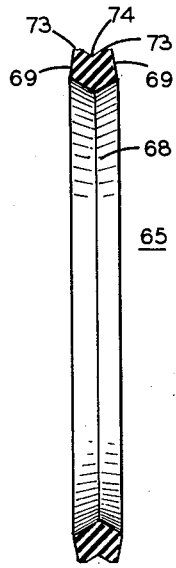
FIG. 12 is a diametric sectional view through a novel form of gasket, or sealing and retaining ring, used to retain the lens assembled with the lamp housing.

Ring 65 is preferably injection molded of an oil resistant resilient rubber or rubber-like material, and is preferably coated with a suitable lubricant such as molybdenum disulfide. As best seen in FIG. 12, the inner periphery 68 of the ring, which is somewhat wider axially than the outer periphery, has a shallow V shape with the sides of the V converging toward the center of the ring. The sides 69 of the ring converge somewhat from the inner periphery to the outer periphery. The outer periphery of ring 65 includes a pair of cylindrical surface portions 73 separated by a shallow V notch 74 whose apex is in the same diametric plane as that of the apex of the inner periphery of the ring. The section of ring 65 is carefully selected so that it will completely fill the facing grooves 38 and 72 when lens 70 is snapped into the housing 30, as best seen in FIG. 4.

The outer surface of lens 70 is substantially smooth from shoulder 71 toward the outer end of the lens, and gradually decreases in diameter from shoulder 71 to a transition plane indicated at 76. Beyond this transition plane, the outer surface of lens 70 decreases more sharply in diameter toward the closed outer end of the lens. As best seen in FIG. 4, this closed end 75 is conical with its apex directed inwardly of the lens.

It will be noted, from FIGS. 1 through 4 and 6, that the outer and inner diameters of lens 70, over the upper 180 degrees of its periphery, are appreciably greater than the corresponding outer and inner diameters over the lower 180 degrees of its periphery. This change in the relative radii of the two halves of the lens begins in a plane at substantially the outer end of the reflector portion 33 of housing 30, with the initial part of the change occurring generally along a plane through the lens at an angle, other than a right angle, to both its axis and its diameter. This produces a sloping bevelled surface 77 on the lower portion of the outer surface of the lens merging into a longitudinally extending bevelled surface 78, there being two of the surfaces or shoulders 77 and 78 extending from a triangular cross section rib 80 at the mid-point of the lower 180 degrees of arc of lens 70.

In a corresponding manner, the lower half of the inner surface of lens 70 is formed with a bevelled transition surface 81, lying in the same oblique plane, or one parallel thereto, as that in which the bevelled surface 77 generally lies, and a longitudinally extending shoulder 82. It should be noted that the inner surface of lens 70 is substantially that of a right cylinder from the open base end of the lens to the transition plane 76, after which the inner surface converges gradually, but at a sharper rate than does the outer surface, toward the closed outer end 75 of the lens. The inner surface is also formed with flutes 85 extending longitudinally thereof, the flutes along the lower half of the inner surface being interrupted at the transition zone 81. These flutes have an outwardly arcuate cross sectional area. The inner surface of end 75 is formed with three concentric circular and preferably triangular cross section ribs 83.

Lens 70 is assembled with housing 30 as follows: In advance of such assembly, gasket 65 is seated firmly in groove 38. Then the lens 70 is simply pressed into the housing, slipping over the gasket 65 until the latter expands into the recess 72 to firmly lock the lens to the housing with shoulder 71 abutting the surface 36 of the reflector portion 33 of housing 31. The lens may be easily removed from the housing by grasping the housing with one hand and the lens with the other and bending the lens outwardly with respect to the housing. However, means are provided to facilitate disengagement of the lens 70 from the housing 30.

Figure 14:
FIG. 14 is a sectional view taken on the line 14—14 of FIG. 13.
Figure 13:
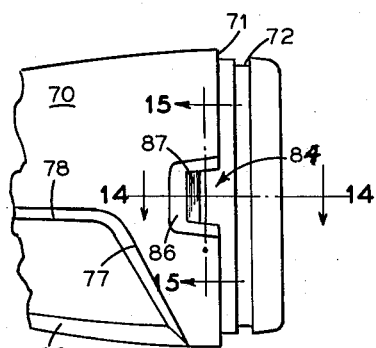
FIG. 13 is a partial elevational view of the lens, illustrating a detail thereof.
Figure 15:
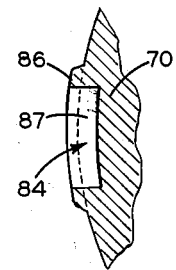
FIG. 15 is a sectional view taken on the line 15—15 of FIG. 13.

Referring more particularly to FIGS. 13, 14 and 15, a pair of diametrically opposite trapezoidal recesses 84 extend outwardly from the shoulder 71 at substantially the horizontal plane through lens 70. Each recess is bounded by a reinforcing rib 86, and has a beveled inner edge 87. To remove lens 70 from housing 30, in the event this cannot readily be done by hand manipulation, the blade of a screwdriver is placed in a recess 84 and, using the outer periphery of the reflecting part 33 of housing 30 as a fulcrum, the lens may be readily pried out. The beveled inner edge 87 assures against breaking of the material of lens 70 under the leverage force of the screwdriver.

The combination of the reflecting surface of housing 30, including the surface 36 and the outwardly flaring surface 88, with the optics of lens 70 including the flutes 85, provides a novel effect when lamp bulb 67 is lit. The effect is that of a central circle of light through the end 75 of the lens, surrounded by an annular sunburst centered on the reflecting portion 36—88. There is thus a circle of light surrounding a circular area of light and spaced radially therefrom. The flutes tend to break-up the light in both the inner circle and the annular ring, giving a very novel and distinctive appearance to the light when it is lit. This is of great value as providing a ready means for distinguishing the light and thus determining its purpose.

Furthermore, inasmuch as bulb 67 in socket 54 is disposed within the cylindrical part of the shock mounting 50, and as this cylindrical part rides on the cantilever fingers 55, any shocks transmitted to the lamp housing from the vehicle are effectively absorbed by the shock mounting and, due to the deflection of socket 54 relative to plate 60, substantially no shock is transmitted to the bulb 60. Consequently, the bulb 67 has a useful life which is a large multiple of the useful life of bulbs in similar lamps not mounted with the shock mounting arrangement of the present invention.

While a specific embodiment of the invention has been shown and described in detail to illustrate the application of the principles of the invention, it will be understood that the invention may be embodied otherwise without departing from such principles.

What is claimed is:

1. An automotive vehicle lamp comprising, in combination, a housing constructed and arranged for mounting upon a portion of a vehicle subjected to road shock; a lens operatively associated with said housing; a cup of relatively soft and flexible material having an apertured base; a lamp bulb socket having conforming seating engagement in and embraced by said cup; and a substantially flat annular metal member surrounding said cup intermediate its ends and having an outer peripheral portion seated in said housing; said cup being formed integral with a plurality of substantially uniformly peripherally spaced flexible and resilient fingers extending from the outer surface of its side wall intermediate the ends thereof, alternate fingers resiliently bearing on one surface of said member and intermediate fingers resiliently bearing on the opposite surface of said member; the side wall of said cup being imperforate in the area of said fingers and extending through the aperture in said annular member to completely isolate said socket from metal-to-metal contact with said member, whereby said lamp socket is isolated from shocks transmitted to said housing.

2. An automotive vehicle lamp comprising, in combination, a housing constructed and arranged for mounting upon a portion of a vehicle subjected to road shock; a lens operatively associated with said housing; a cup of relatively soft and flexible material having an apertured base; a lamp bulb socket having conforming seating engagement in and embraced by said cup; and a substantially flat annular metal member surrounding said cup intermediate its ends and having an outer peripheral portion seated in said housing; said cup being formed integral with a plurality of substantially uniformly peripherally spaced flexible and resilient fingers extending from the outer surface of its cylindrical side wall intermediate the ends thereof, alternate fingers resiliently bearing on one surface of said member and intermediate fingers resiliently bearing on the opposite surface of said member; said fingers intersecting the outer surface of the side wall of said cup alternately on opposite sides of a transverse plane, and the free ends of said fingers extending across said plane when said cup is disengaged from said annular metal member; the side wall of said cup being imperforate in the area of said fingers and extending through the aperture in said annular member to completely isolate said socket from metal-to-metal contact with said member, whereby said lamp socket is isolated from shocks transmitted to said housing.

3. An automotive vehicle lamp as claimed in claim 1 in which said flat annular metal member is formed of relatively hard and resilient material, and said outer peripheral portions comprise fingers extending from the outer periphery of said member; said housing having a body portion formed with an outwardly facing ledge engageable by the fingers of said annular metal member, and the transverse dimension of said body portion of said housing being somewhat less than that of said fingers whereby said annular metal member is deformed to engage said fingers with said ledge and the outer ends of said fingers of said metal member tend to bite in to the inner surface of said housing to lock said annular metal member in position.

4. An automotive vehicle lamp as claimed in claim 1 including a conductor having one terminal secured to said socket and the other terminal secured to said metal member.

5. An automotive vehicle lamp as claimed in claim 1 in which said cup is formed of soft rubber.

6. An automotive vehicle lamp as claimed in claim 1 in which said flat annular metal member is formed of Phosphor bronze.

7. An automotive vehicle lamp comprising, in combination, a housing constructed and arranged for mounting upon a portion of a vehicle, said housing having a relatively elongated generally cylindrical shape and a generally circular cross section, one end of the housing being closed and the other end of the housing being open; said housing having a substantially cylindrical inner surface adjacent its open end and formed with a circumferential groove of rectangular cross section; a lamp socket mounted in said housing; a generally cylindrical lens having a closed outer end and an open inner end formed with a substantially cylindrical peripheral surface portion for a distance from said open inner end; the cylindrical surface portion of said lens being formed, outwardly of said open inner end, with a shallow circumferential groove of substantially rectangular cross section arranged to be aligned with said first mentioned circumferential groove; said housing having an outwardly facing shoulder outwardly of the ring seating groove therein; the cylindrical surface portion of said lens being of reduced diameter relative to the outer periphery of said lens outwardly of the annular groove in said lens to form a shoulder engageable with the shoulder on said housing when said grooves are substantially aligned, and a ring of compressible sealing material seated in said first mentioned circumferential groove and initially projecting somewhat outwardly of said cylindrical surface of said housing; said ring having a cross sectional area including a shallow obtuse angle V on its inner periphery with the apex of the V facing radially inwardly; the outer periphery of said ring comprising a pair of axially spaced substantially cylindrical surfaces between which is an outwardly facing obtuse angle V-shaped recess; the side edges of said ring sloping toward each other from the inner periphery of said ring to the outer periphery thereof; whereby said ring, upon insertion of the open end of said lens into said housing, will be initially compressed into said first-mentioned groove by the cylindrical surface portion of said lens and then engage in and fill the peripheral groove in the cylindrical surface adjacent the open end of said lens to substantially fill both of said grooves to lock said lens to said housing.

8. An automotive vehicle lamp comprising, in combination, a housing constructed and arranged for mounting upon a portion of a vehicle, said housing having a relatively elongated generally cylindrical shape and a generally circular cross-section, one end of the housing being closed and the other end of the housing being open; said housing having a substantially cylindrical inner surface adjacent its open end formed with a circumferential groove of rectangular cross-section; a lamp socket mounted in said housing; a generally cylindrical lens having a closed outer end and an open inner end formed with a substantially cylindrical peripheral surface portion for a distance from its open inner end; the cylindrical surface portion of said lens being formed with a shallow circumferential groove of substantially rectangular cross-section arranged to be alined with said first mentioned circumferential groove; and a ring of compressible sealing material seated in said first mentioned circumferential groove and initially projecting somewhat inwardly of said cylindrical surface of said housing; said ring, upon insertion of the open end of said lens into said housing, engaging in and filling the peripheral groove in the cylindrical surface adjacent the open end of said lens to lock said lens to said housing; said housing having an outwardly facing shoulder outwardly of the ring seating groove therein; the cylindrical surface portion of said lens being of reduced diameter relative to the outer periphery of said lens outwardly of the annular groove in said lens to form a shoulder engageable with the shoulder on said housing when said grooves are substantially alined; and in which said housing has a flared peripheral enlargement adjacent its open end and extending outwardly over the open end of said lens, said peripheral enlargement including a substantially hemispherical surface facing toward the closed end of said lens and connected by a radial surface intersecting said cylindrical surface of said housing and forming said shoulder on said housing; said hemispherical and radial surfaces forming a reflector facing toward the closed end of said lens; said reflector surrounding the outer surface of said lens to form an annular reflecting surface around said lens.

9. An automotive vehicle lamp as claimed in claim 8 in which the outer surface of said lens is formed with a recess opening through said shoulder, said recess including a relatively elongated and rectilinear outer edge parallel to said shoulder for engagement by the blade of a screwdriver levered on said flared enlargement of said housing to force said lens out of said housing.

10. An automotive vehicle lamp as claimed in claim 9 in which the edge of said recess parallel to said shoulder is tapered to prevent breaking of the material of said lens by the blade of such screwdriver.

11. For use in an automotive vehicle lamp to lock a lens into a housing, the lens and housing having substantially telescoping cylindrical surfaces formed with facing circumferential grooves, a ring of compressible sealing material having a cross sectional area including a shallow obtuse angle V on its inner periphery with the apex of the V facing radially inwardly; the outer periphery of said ring comprising a pair of axially spaced substantially cylindrical surfaces between which is an outwardly facing obtuse angle V-shaped recess; the side edges of said ring sloping toward each other from the inner periphery of said ring to the outer periphery thereof; whereby said ring will substantially fill both of said grooves when the lens is engaged in the housing.

12. An automotive vehicle lamp as claimed in claim 8 in which the interior surface of said lens is formed with longitudinally extending flutes having arcuate cross section exposed surfaces.

13. An automotive vehicle lamp as claimed in claim 12 in which one-half of said lens has outer and inner diameters less than the corresponding diameters of the other half of said lens, whereby to form a pair of longitudinally extending shoulders joining one arcuate half of said lens to the other arcuate half thereof.

14. An automotive vehicle lamp as claimed in claim 13 wherein the differential in the outer and inner diameters of the two arcuate halves of the lens terminates at a plane short of the open inner end of the lens, the plane extending at an angle to both the axis and diameter of the lens.

15. An automotive vehicle lamp as claimed in claim 14 in which the closed outer end of said lens is formed as a conical recess having its apex extending toward the open end of said lens.

References Cited in the file of this patent

UNITED STATES PATENTS

| | | |
|---|---|---|
| 1,915,967 | Bailey | June 27, 1933 |
| 1,955,602 | Lamblin-Parent | Apr. 17, 1934 |
| 1,987,117 | Levesque | Jan. 8, 1935 |
| 2,058,084 | June | Oct. 20, 1936 |
| 2,148,870 | Mead et al. | Feb. 28, 1939 |
| 2,616,029 | Osowski | Oct. 28, 1952 |
| 2,730,611 | Black | Jan. 10, 1956 |
| 2,777,049 | Clark | Jan. 8, 1957 |
| 2,809,283 | Spencer | Oct. 8, 1957 |
| 2,964,343 | Klingler | Dec. 13, 1960 |
| 2,970,209 | Glowzinski et al. | Jan. 31, 1961 |

FOREIGN PATENTS

| | | |
|---|---|---|
| 357,917 | Great Britain | Oct. 1, 1931 |